April 20, 1954
G. E. HANSEN
2,676,058
SELF-CLEANING SHOWERHEAD
Filed Aug. 11, 1951
2 Sheets-Sheet 2
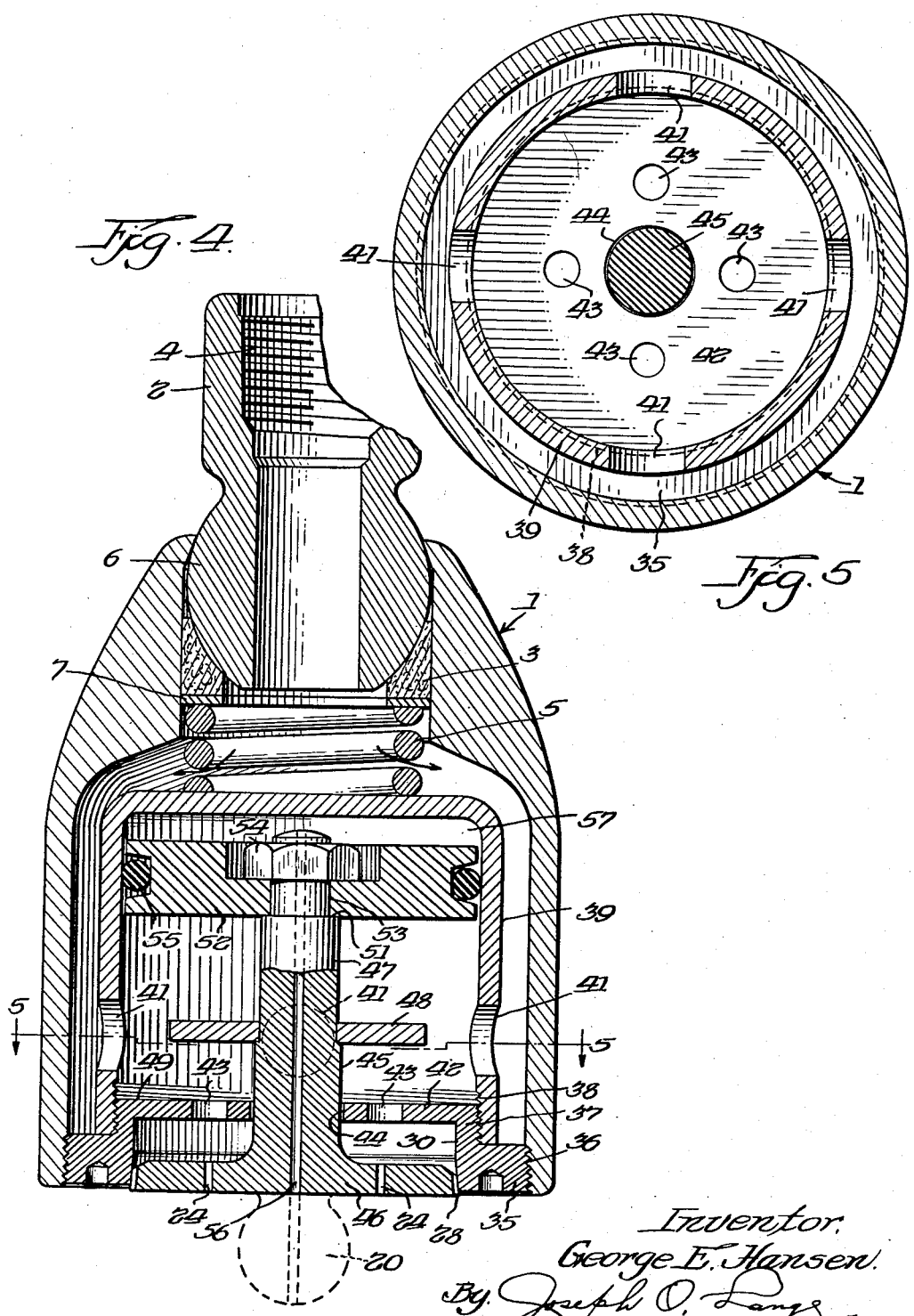
Inventor,
George E. Hansen.
By Joseph O. Lange
Atty.

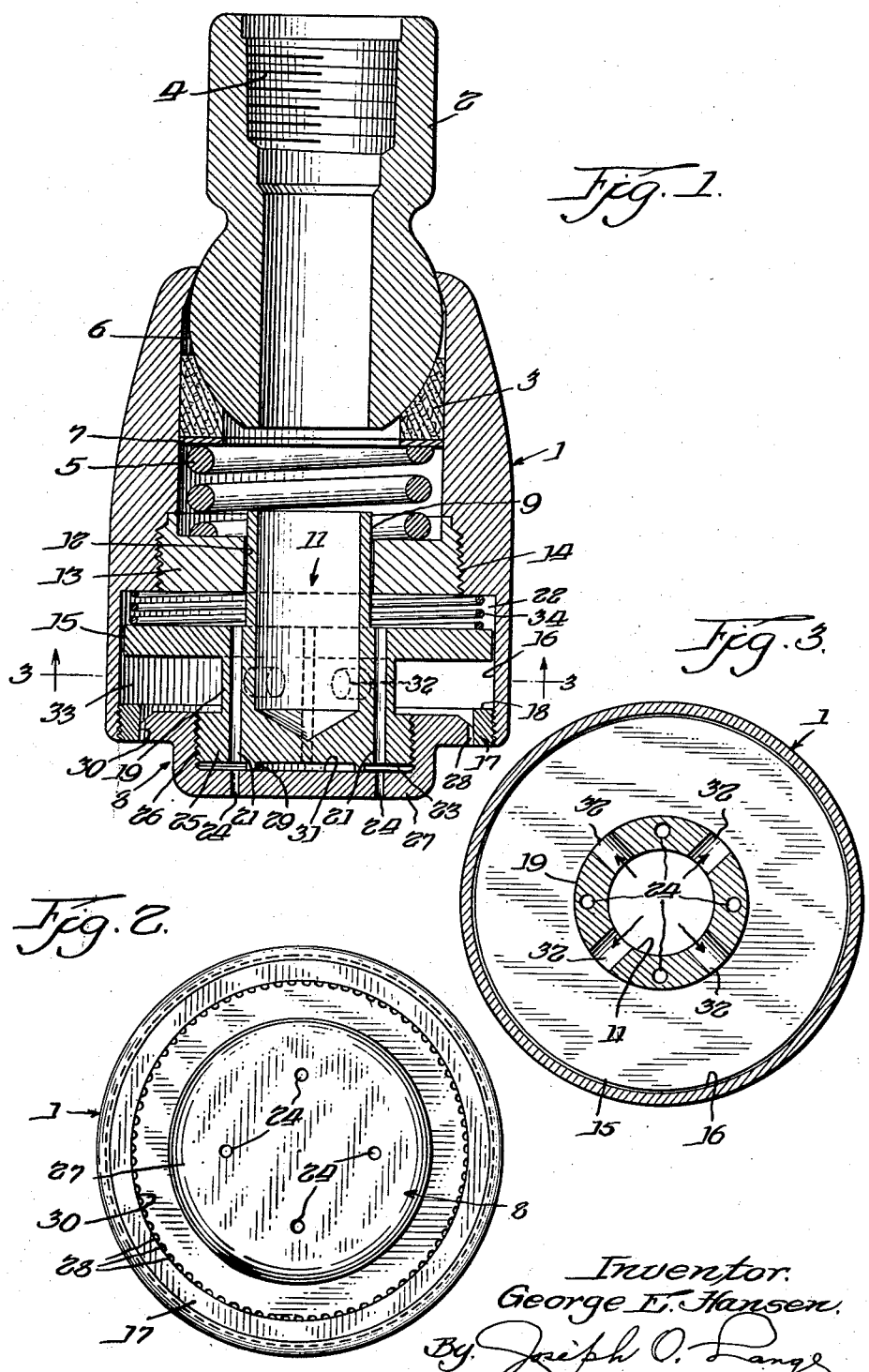

Patented Apr. 20, 1954

2,676,058

UNITED STATES PATENT OFFICE 2,676,058

SELF-CLEANING SHOWERHEAD

George E. Hansen, Elmwood Park, Ill., assignor to Crane Co., Chicago, Ill., a corporation of Illinois Application August 11, 1951, Serial No. 241,419

1 Claim. (Cl. 299—59)

This invention relates to showerheads or the like, and, more particularly, it is concerned with a self-cleaning type, wherein the action of water flow or pressure within the heads aids in the improved operation of the device.

In order to obtain a true appreciation of the invention, it should be understood that heretofore one of the principal problems affecting the satisfactory performance of a showerhead has been the tendency to clog, and, in many cases, this condition has come about largely due to the accumulation of foreign matter, such as calcium carbonate or lime in the supply line. This is especially true in certain regions of the country where hard water prevails. In many cases, such failure occurred because of the fact that the water would remain entrained or trapped within the showerhead and thus cause a slow and objectionable dripping after the shower had been shut off and, at the same time, permitting the said lime to form flow impeding deposits in the small apertures of the head.

It has been found that if after use the interior of the showerhead were fully opened to atmosphere so that any water otherwise accumulating within the head could discharge quickly to the receptor below and thus permit the head to dry relatively quickly the lime accumulations would be negligible, and the operation of the head would be vastly improved in the course of service even over long periods of time.

Therefore, it is one of the more important objects of this invention to provide for a showerhead in which the water normally accumulating within the head would be discharged because a movable end portion of the head would be self-opening and thus quickly discharge such otherwise retained water to atmosphere after the line flow has ceased.

Other important objects and advantages will become more readily apparent upon proceeding with the following structural descriptions read in light of the accompanying drawings, in which Fig. 1 is a sectional assembly view of a preferred embodiment.

Fig. 2 is an end exterior view of the embodiment shown in Fig. 1.

Fig. 3 is a sectional view taken on the line 3—3 of Fig. 1.

Fig. 4 is a sectional assembly view of a modified form.

Fig. 5 is a sectional view on the line 5—5 of Fig. 4.

Similar reference characters refer to similar parts throughout the several views.

Referring now to Fig. 1, a showerhead generally designated 1 is connected in the usual manner to a line by means of the tailpiece 2 which is preferably held in fluid seal packed relation by means of the packing 3 to the head 1. The tailpiece 2 is provided with the customary pipe threads 4 for connection to a conduit supply line (not shown). In the regular manner, a coil spring 5 is employed to hold the packing 3 in compressed condition relative to the ball connection 6 by its bearing against the washer 7. A reciprocally movable stream forming head member, generally designated 8, is provided with an inner tubular end portion 9 having the chamber 11, the outer periphery of the tubular extension 9 being slidably received, as at 12, within the threaded guide or bushing 13 attached by means of the threads 14 to the head 1. An inner peripheral portion 15 of the movable head 8 is slidably received within the large bore 16 thereby to serve desirably as a means for supplementing the guide means provided within the surface 12 of the member 13. The peripheral head portion 15 moving within the surface 16 is held in place against dropping out by means of the annular guide 17, the member 15 being limited in its annular axial movement downwardly by means of the stop afforded by the surface 18 for reasons hereinafter explained in more detail.

As shown more clearly in Fig. 3, a lower portion of the head immediately below the guide 15 is of hollow elongated or neck form, as at 19, with the interior thereof being defined by the chamber 11. The wall space defined by the peripheral surface 19 has a number of annularly arranged vertical apertures 21 serving to relieve any line fluid pressure normally tending to accumulate within the chamber 22 and allowing such fluids therewithin to discharge into the lower chamber 23 and thence outwardly to atmosphere via the apertures 24 to form a part of the discharging stream.

Threadedly mounted around the lowermost depending portion 25 and preferably threadedly attached thereto, as at 26, is the shower stream-forming head 27 having on its periphery a series of serrations forming discharge apertures, as at 28, when received within the head as shown. To allow for a space to form the said chamber 23, an annular raised face or bead 29 is provided which abuts against the inner surface 31 of the head forming member 27. To obtain the transverse discharge of accumulated liquid from the chamber 11, it is desirable as shown more clearly in Fig. 3, to provide the radially extending spaced apart ports 32 which allow for fluids from the chamber to enter the chamber 33 and thence outwardly past the annularly arranged serrations 28 to form the desired shower stream, augmented by the central discharge of liquid through the apertures 24.

It will be noted that within the chamber 22 and bearing against shoulder within the head 1 and also bearing against an upper surface of the enlarged guide portion 15, a coiled spring 34 is interposed for reasons hereinafter explained.

In actual operation, it will be noted that liquid will enter the chamber 11 through the inlet of the superposed tailpiece 2, and it will then discharge outwardly through the radially disposed apertures 32 into the chamber 33, thereby creating internal fluid pressure within the latter chamber to thus immediately cause the head 8 and its attached portion 15 to be moved upward to assume the operating stream forming position shown in Fig. 1 of the drawing. This lifting movement is accomplished because as indicated the projection 15 has a larger transverse surface area than the diameter of the head defined by the annular serrations 28 and thus the latter member is caused to be lifted against the resistance of the spring 34 upon flow occurrence. Should there be any liquid leakage past the member surface 15 and the head base 16 into the spring chamber 22, any such tendency to accumulate liquid pressure therewithin would be disposed of by such directing liquid into the apertures 21 and thence outwardly into the head passages 24, out to atmosphere. It will be clear that immediately upon cessation of line flow, the spring 34 will cause the member generally designated 8 to be moved downwardly until the upper enlarged portion 15 contacts the annular surface 18 preferably in pressure sealing relation in order to eliminate any additional dripping from the head at this location after the shower is shut off.

Thus, it will be clear that when the head 8 drops, the water normally accumulated therewithin is drained off, and it should, of course, be apparent that this can be accomplished without the aid of the spring 34, since by mere gravity, assuming the head 8 is installed on a substantially vertical line, the head 8 would drop axially downward until the enlarged area member 15 contacts the surface 18 of the annular threaded bushing 17. Since the stem and the face are preferably made integral only one moving part is necessary in forming this self-cleaning showerhead. When the shower is turned on, the water pressure within the chamber 33 raises the piston 15 and the annular tapered serrated face 28 engages the similarly tapered surface 30 to form an even spray or shower stream.

Referring now to the modified construction shown in Fig. 4, a similar shower casing or head 1 is used, having the usual packing 3, the tailpiece 2, with the threaded inlet connection 4, and the interposed spring 5, to bear against the packing in the same manner as described in connection with Fig. 1. However, in this structure, the end of the casing is provided with a threaded annular supporting member 35, threadedly attached as at 36 to the head casing, and having an inner reduced shank portion 37 threaded, as at 38, to receive the hollow inverted cup member 39 having a plurality of apertures annularly arranged, as at 41. The member 35 is also provided at an inner recessed portion with the usual stream forming tapered annular surface 30 for engagement by the annularly serrated surface 28 of the stream-forming head portion 46. In this structure, the member 35 has an inwardly flanged portion 42 apertured as at 43 and provided with the central opening 44 to receive the annular neck or shank 45 of the movable stream-forming member 46. At the upper end of the reduced shank 47, a shouldered annular washer-like member 48 is fixedly positioned. The diameter of the latter member is sufficiently large so that when the member 46 drops to its lowermost position, the member 48 will contact the surface 49 and close the annularly disposed apertures 43. At the upper or inner end of the shank 47, a shoulder 51 is provided upon which a piston 52 is fixedly positioned and is held in place by means of the threaded end portion 53 and the nut 54. Preferably, although not necessarily, the piston 51 is provided with an O-sealing ring 55. For the full length of the shank 45, and extending through the head 46 to atmosphere, as indicated, a bleed aperture 56 is provided for relieving any liquid pressure which might get by and enter the chamber 57. In the event that the head 46 should stick and fail to drop as hereinafter described, a knob handle 20 may be used for manually gripping the same and pulling it down to break the contact at the surface 28.

Thus, in operation, it will be clear that fluid flow enters the head in the path indicated by the arrows when the shower valve is turned on entering through the annularly disposed apertures 41 of the inverted cup 39, thereby immediately exerting liquid pressure against the underside and larger area of the piston 52 to cause the latter member to move upwardly and carry with it the stream-forming head member 46. Thus, the serrated annular surface 28 will contact the annular tapered bore 30 to form the shower stream in addition to that stream portion formed by the discharge through the apertures 24 as previously described. Immediately upon pressure flow ceasing, the shower stream-forming head 46 will drop until the interposed washer member 48 contacts the surface 49 on the inturned flange 42, thus closing the annularly arranged apertures 43 and effectually stopping objectionable dripping to atmosphere.

It should, of course, be clear that while only two embodiments have been shown describing the applicant's invention, it is capable of a number of different detailed forms, and, therefore, the scope of the invention should be measured by the appended claim.

I claim:

In a showerhead or the like, the combination of a casing, a reciprocally movable stream-forming member within said casing, guide surface means for the said stream-forming member within the said casing, annular fixed means cooperating with the said casing to form the shower stream, the said stream-forming member having an annularly projecting enlarged flanged portion and a reduced hollow central portion for slidable guiding contact with said guide surface means of the said casing, a chamber within the casing below said enlarged flanged portion and above the stream-forming portion of the movable member, annularly disposed apertures in the wall of the hollow central portion of the movable member communicating with the said casing chamber, whereby upon predetermined liquid entering said chamber the said stream forming member is moved upwardly to make stream-forming contact with an annular surface of the said casing, and resilient means on said enlarged flanged portion of the stream-forming member for normally breaking the said stream-forming member contact with the casing upon cessation of liquid flow through the showerhead casing.

References Cited in the file of this patent

UNITED STATES PATENTS

| Number | Name | Date |
|---|---|---|
| 1,996,545 | Knowlton | Apr. 2, 1935 |
| 2,013,959 | Hukari | Sept. 10, 1935 |
| 2,164,411 | Kennedy | July 4, 1939 |
| 2,298,680 | Clark | Oct. 13, 1942 |